United States Patent [19]
Friedman et al.

[11] 4,201,980
[45] May 6, 1980

[54] GCR DATA WRITE CONTROL APPARATUS

[75] Inventors: Stanley I. Friedman; Charles P. Cobeen, both of Phoenix; Herbert K. Jacobsthal, Scottsdale, all of Ariz.

[73] Assignee: Honeywell Information Systems Inc., Phoenix, Ariz.

[21] Appl. No.: 973,260

[22] Filed: Dec. 26, 1978

[51] Int. Cl.[2] .......................................... H03K 13/24
[52] U.S. Cl. .............................. 340/347 DD; 360/40
[58] Field of Search ................ 340/347 DD; 360/39, 360/40, 41, 42, 43, 44; 364/900; 178/66, 67, 68

[56] References Cited
U.S. PATENT DOCUMENTS

Re. 28,330   2/1975   Milligan .................................. 360/40

OTHER PUBLICATIONS

Sidhu, "Computer Design", Dec. 1976, pp. 84–88.

Primary Examiner—Charles D. Miller
Attorney, Agent, or Firm—T. W. DeMond; W. W. Holloway, Jr.; R. T. Reiling

[57] ABSTRACT

This relates to an apparatus for converting raw data into GCR data and for controlling the recording of GCR data on magnetic tape. An ordered series of instructions is stored in a first programmable read only memory (PROM). A second PROM contains a special character table and a code conversion table, and receives raw data. A third PROM stores addresses which are used to access the second PROM and are indicative of whether raw data is to be converted or a special character is to be generated.

10 Claims, 9 Drawing Figures

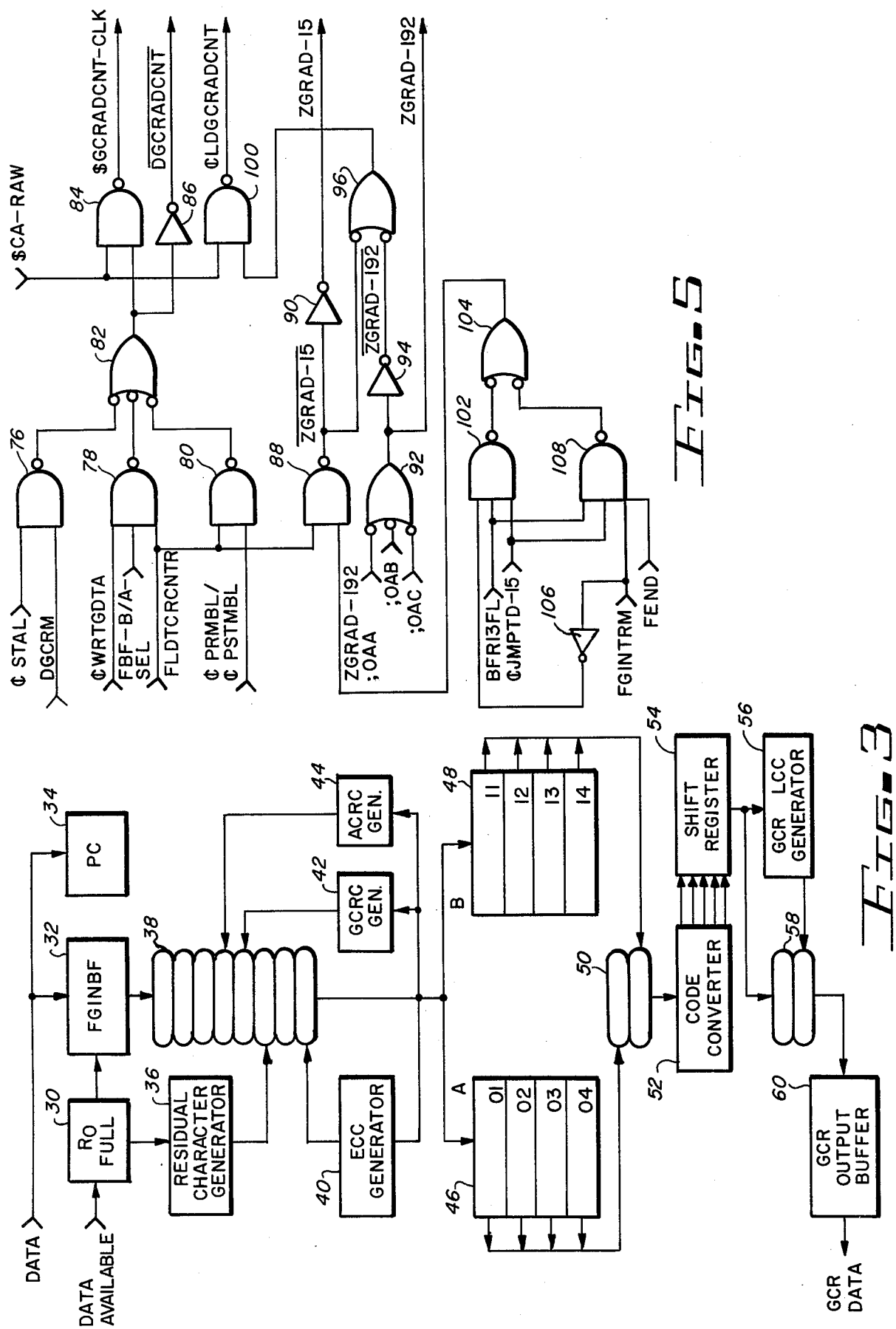

GCR DATA WRITE CONTROL APPARATUS

BACKGROUND OF THE INVENTION

This invention relates generally to the writing of data on magnetic mass storage media and, more particularly, to an apparatus for controlling the writing of GCR data on magnetic tape, said apparatus employing programmable read only memories (PROMS).

Modern data processing system may require information to be written on magnetic tape in one or more of several known formats; e.g. non return to zero-change on 1's (NRZI), phase encoded (PE), or group coded recording (GCR). Copending U.S. patent application Ser. No. 973,259 filed on Dec. 26, 1978 on Write Control Apparatus describes a write control apparatus for constructing the various formats. However, if the GCR format is being written, additional circuitry is required to construct the actual GCR data record consisting of the actual data preceded by a preamble and followed by a postamble. While the GCR data record format will be somewhat described below, a detailed description can be found in the American National Standards Institute standard ANSI X3.54 dated June 10, 1976.

Since the GCR data record includes data groups, a CRC group, a Residual group and a plurality of subgroups consisting of Termination, Sync, Mark subgroup types, written in a prescribed sequence, it has in the past been necessary to provide a large amount of logic circuitry to produce the required record format. This is not only costly, but greatly adds to the overall complexity of the system.

SUMMARY OF THE INVENTION

It is the object of the present invention to provide an apparatus for writing GCR data records on magnetic tape including the required preambles and postambles.

It is the further object of the invention that the write apparatus employ a plurality of programmable read only memories (PROMS) to accomplish the required formatting thus eliminating a substantial amount of circuitry.

According to a broad aspect of the invention there is provided a GCR write control apparatus for use in a data processing system wherein raw data is group coded recorded prior to being written on magnetic tape, comprising:

first memory means for storing a plurality of instructions;

second memory means for storing a special character table and a code conversion table for converting raw data into GCR data;

first addressing means for accessing said first memory means;

second addressing means for accessing said second memory means, said second addressing means coupled to the output of said first addressing means;

transmitting means coupled to the output of said second memory means and synchronized with said raw data for transmitting special characters and converted data to said magnetic tape; and control means for incrementing said first addressing means.

The above and other objects of the invention will be more clearly understood from the following detailed description taken in conjunction with the accompanying drawings, in which:

BRIEF DESCRIPTION OF THE DRAWINGS

FIG. 3 is a data flow chart;

FIG. 5 is a logic diagram of the PROM address control shown in FIG. 4.

DESCRIPTION OF THE PREFERRED EMBODIMENT

Figure 1:
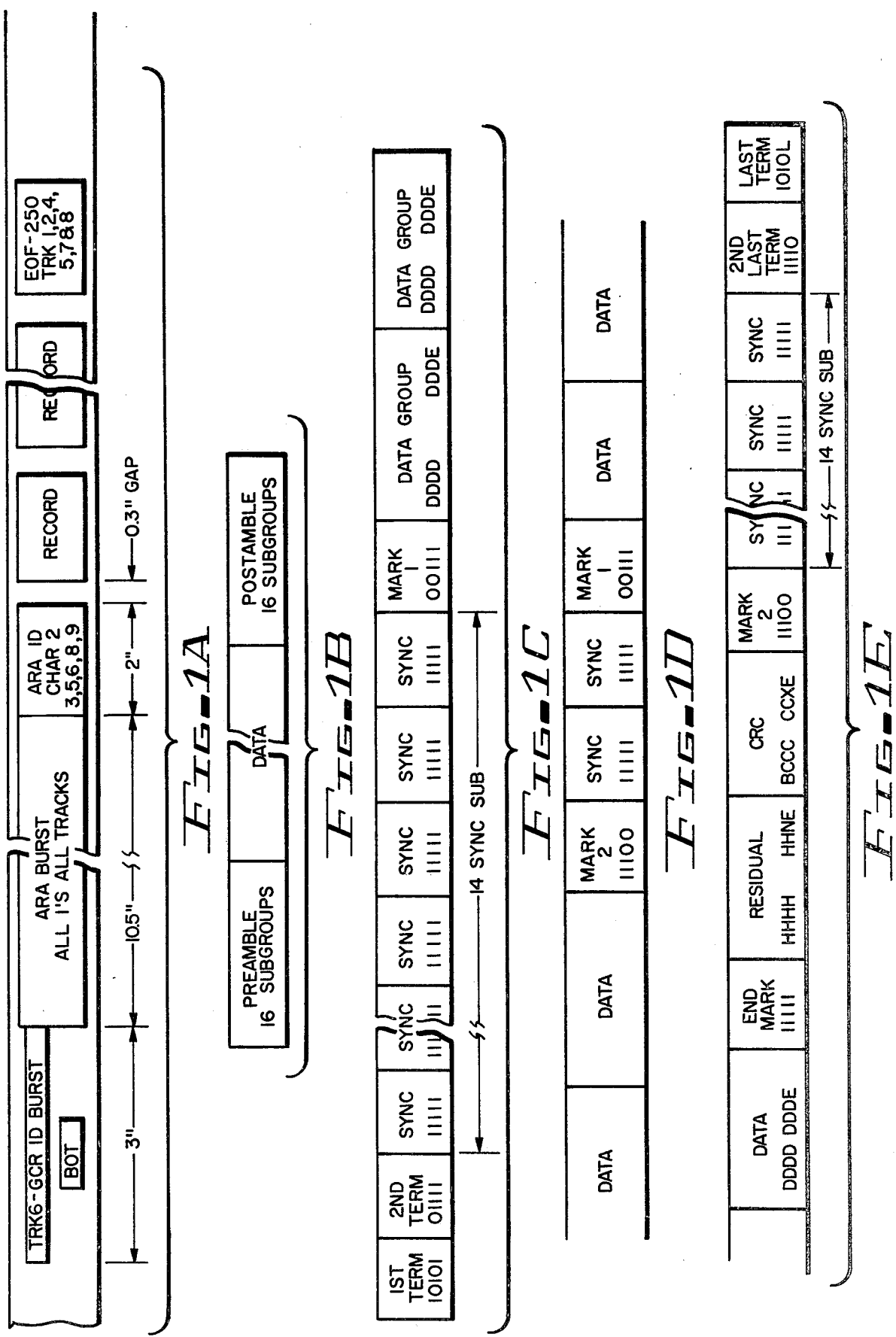
FIGS. 1A-1E illustrate the GCR data format.

FIG. 1A illustrates the format for GCR data recording. It begins with a beginning of tape (BOT) marker and a GCR identification burst, followed by an automatic read amplification (ARA) burst, followed by an ARA identification character as defined in above referenced ANSI standard. After a 0.3 inch gap, there is plurality of data records which are terminated by an end of file (EOF) character consisting of 250 1's on tracks 1, 2, 4, 5, 7 and 8.

FIG. 1B illustrates the GCR data record format. The data is preceded by a preamble consisting of 16 subgroups, and the data is followed by a postamble consisting of 16 subgroups. The format of the preamble is shown in FIG. 1C and consists of first and second termination subgroups (10101 and 01111) and 14 synchronization subgroups (11111). The preamble is followed by a mark subgroup (00111). This is followed by the data groups each consisting of 7 data characters (D) followed by an ECC character.

The end of record format is shown in FIG. 1E. The last data group is followed by an end mark subgroup (11111), a residual group consisting of 6 pad or data characters (H) followed by a group ACRC character (N) and an ECC character (E), a CRC consisting of a pad or CRC character (B) followed by five CRC characters (C) followed by a residual character (X) followed by an ECC character (E), a mark Z subgroup (11100), a postamble consisting of 14 synchronization subgroups (11111), followed by a second last termination subgroup (11110) followed by a last termination subgroup (1010L where L is an LCC character).

Figure 2:
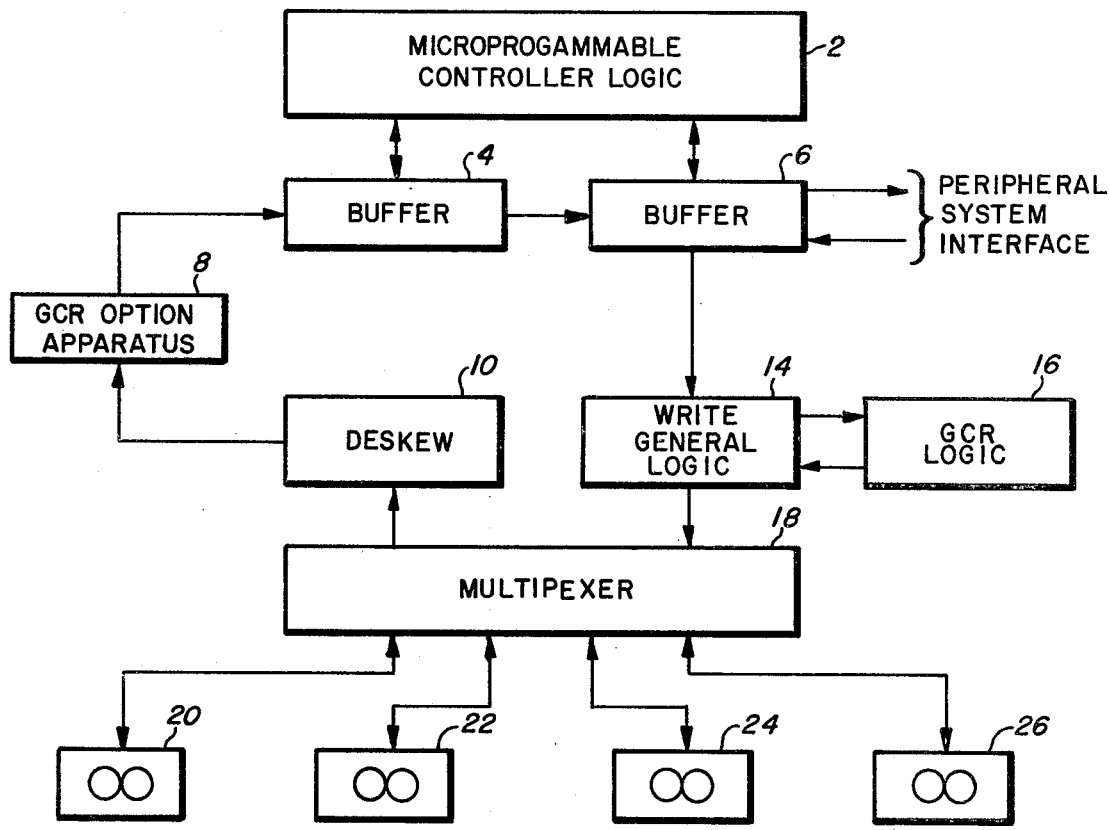
FIG. 2 is a block diagram illustrating a tape handler control apparatus.

FIG. 2 is a block diagram illustrating in general form a tape handler control apparatus. The block representing the inventive GCR write control apparatus is shown as block 16. Micro programmable control logic 2 is shown as having an input from buffer 4 and from buffer 6. Buffer 6 is in turn coupled to a peripheral systems interface. In a read mode, buffer 4 receives GCR information from GCR option apparatus which has an input coupled to the output of unit 10. Multiplexer 18 selects which of the tape handlers 20, 22, 24 and 26 is to be coupled into the remainder of the system for both reading and writing purposes. A output of multiplexer 18 is coupled to the input of DESKEW unit 10.

In a write mode, an output buffer 6 is coupled to the write general logic 14 which has an output coupled to multiplexer 18. Write logic 14 which is described in the above cited application, is coupled to the GCR logic 16, the subject of this application, which provides the required GCR coding.

FIG. 3 is a data flow chart illustrating how the GCR data record is produced. As described in the above cited copending application, data in the form of 9 bit bytes is first applied to a switch. If this system is operating in a write mode, this switch is enabled and passes data through to packing apparatus if packing is required. If no packing is required, the data is passed into a first input buffer (RO). If this data is to be GCR coded, the data is applied to GCR input buffer 32. A data available signal indicating that the RO buffer is full is applied to RO full unit 30.

Parity checking apparatus 34 is provided to check the data coming from the RO buffer since the GCR option may be provided on a separate board and errors could be introduced into the data as a result of transmission. When the RO buffer is full, a signal is generated by RO full apparatus 30 and enables the FGINBF buffer 32 to accept the contents of the RO buffer. The output of FGINBF buffer 32 is then coupled to the input of switch 38 in which various characters are incorporated. These are shown as being generated in Residual Character Generator 36, ECC generator 40, CRC generator 42 and ACRC generator 44. The outputs of each of these generators are coupled back into switch 38.

The output of switch 38 is coupled to the inputs of two buffers, A46 and B48, each consisting of 4 bits. While only two such buffers are shown, 18 such buffers exist in actuality to accommodate 9 tracks. The first four data bits from switch 38 are applied to buffer A46 and are shifted from the 01 location to the 04 location until buffer A46 is full. The next three data bits are applied to buffer B48 and are shifted from the 11 position to the 14 position until locations 12, 13 and 14 are full leaving position 11 empty. The ECC character above described then occupies the 11 position in buffer B48, thus forming a data group having seven user character and one ECC character as is shown in FIG. 1C. The contents of buffers A46 and B48 are then switched via switch 50 into code converter 52 which converts the four bit data groups into five bit GCR codes in accordance with the following:

| Input Data to GCR | |
|---|---|
| 0000 | 11001 |
| 0001 | 11011 |
| 0010 | 10010 |
| 0011 | 10011 |
| 0100 | 11101 |
| 0101 | 10101 |
| 0110 | 10110 |
| 0111 | 10111 |
| 1000 | 11010 |
| 1001 | 01001 |
| 1010 | 01010 |
| 1011 | 01011 |
| 1100 | 11110 |
| 1101 | 01101 |
| 1110 | 01110 |

These codes are applied to shift register 54 which has an output coupled to both switch 58 and GCR LCC generator 56. The LCC character is placed in the last position of the postamble as shown in FIG. 1E. GCR data character is supplied at the output of GCR output buffer 60.

Figure 4:
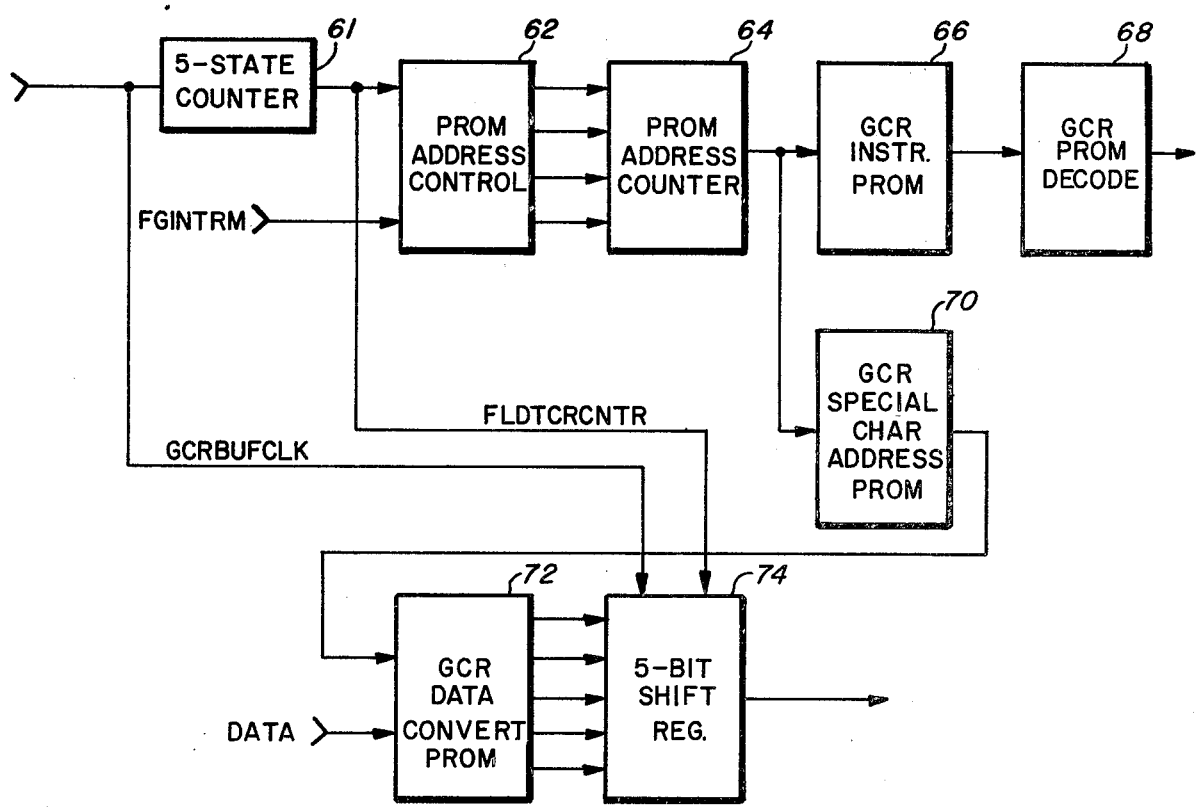
FIG. 4 is a block diagram of the GCR write control apparatus according to the present invention.

FIG. 4 is a block diagram of the inventive GCR write control apparatus. A 5-state counter 61 has applied to its input a source of clock pulses which is likewise applied to an input of 5-bit shift register 74. The 5-state counter will generate a signal on each fifth count which is likewise applied to 5-bit shift register 74. The 5-state counter will generate a signal on each fifth count which is likewise applied to 5-bit shift register to permit parallel loading of GCR converted data from data converter 72 into 5-bit shift register 74. This signal is also applied to PROM address control 62. PROM address control 62 generates the following control signals: (1) Jump to 15 (ZGRAD-15); (2) jump to 192 (ZGRAD-192); (3) an address counter clock (GCRADCNTCLK); and (4) a load address counter signal (LDGCRADCNT). The details of the PROM address control are shown in FIG. 5 which will be discussed below. The output of PROM address counter 64 is applied to GCR instruction PROM 66 and GCR special character address PROM 70. The output of instruction PROM 66 is received by GCR PROM decode unit 68 and decoded therein.

The output of special character address PROM 70 is applied to the inputs of GCR data converter 72 as is raw data to be GCR coded. If the addressed content of GCR special character address PROM 70 is other than 0 special characters such as SYNC, MARK 1, MARK 2 first terminate, etc.will be generated as will be described below. There are shown in FIGS. 1C, 1D and 1E. If the output of special character address PROm 70 is 0, the four bits of raw data applied to data converter 72 will be converted to five bit GCR code. The converted GCR code is loaded into 5-bit shift registers 74 on the occurrence of an output from 5-state counter 61. During subsequent clock signals, the contents of 5-shift register 74 will be shifted out serially.

With the exception of PROM address control 62, the remaining units shown in FIG. 4 may comprise commericially available units. For example, PROMS 64, 70 and data converter 72 may be constructed from 256X4 PROMS of the type manufactured by Monolithic Memories and bearing part numbers 6300. GCR PROM decode 68 may be a one-of-ten decode of the type manufactured by Texas Instruments and bearing part number SN 7442. Finally, PROM address counter 64 may be comprised of four bit up/down counters of the type also manufactured by Texas Instruments and bearing part number SN74193.

To best illustrate the operation of the apparatus shown in FIG. 4, references made to Appendix A which contains a listing of the GCR Instruction PROM (66) Program and the GCR Code Converter (72) Program. Referring to the GCR Instruction PROM Program, the left-most column indicates the sequence of addresses generated by PROM 66 and special character address PROMS 70. The instruction PROM column indicates the contents of the addressed location in instruction PROM 66. The special character address PROM column indicates the contents of the addressed location in special character address PROM 70. The right-most column indicates the function carried out by the instruction accessed from instruction PROM 66. Assuming for the time being that after clearing of the PROM address counter 64, the address counter is incremented to the 01 state, this address (01) is applied to instruction PROM 66 and special address PROM 70. As shown in the GCR Instruction PROM Program, the contents of this address in instruction PROM 66 corresponds to a preamble instruction (PRMBL) which is decoded in PROM decode 68. The contents of special character address PROM 70 at address 01 is 0100 which is applied to converter 72. Since the output of the special character address PROM 70 is other than 0 (specifically it is 4), the binary number 00010101 will be retrieved from GCR data converter 72 as is shown at the 40-4F address (hexadecimal notation) of the GCR code conversion program. Since the three left-most bits are ignored, this corresponds to the first termination group as is shown in FIG. 1C. The PROM address control unit 62 then generates a signal which causes the PROM address counter 64 to increment to its next state i.e., 02. Again referring to the GCR Instruction PROM Program, the contents of address 02 in the special character address PROM is 0110 or decimal 6. The location 60-6F containing 00011110 will be accessed from the PROMS comprising the GCR data converter and loaded into the 5-bit shift register 74. This corresponds to the second termination subgroup shown in FIG. 1C. In a similar manner, and by incrementing the PROM address counter, it can be seen that the fourteen SYNC subgroups and the Mark 1 subgroup are generated.

When the address counter has been incremented to 18, corresponding to a write GCR data (WRTGDTA) instruction from instruction PROM 66, it can be seen from the GCR PROM Program that the contents of address 18 in the special character address PROM 70 contains 0000. In this case, referring to the GCR code conversion program, since the output of the special character address PROM 70 is 0, the GCR data converter will convert the dat which appears on its raw data input in accordance with the above table and as is shown in the GCR code conversion program. It can be seen that instructions 18 through 175 contain the write GCR data instruction.

If more than 158 GCR data groups are to be written and the 159th data group is a full data group, then the instruction at address 176 in the GCR instruction PROM 66 (JMPTO-15) causes the Mark 2 group to be generated and also causes the address 15 to be inserted into the address counter. In this manner, the resync subgroup shown in FIG. 1D consisting of the Mark 2 subgroup, 2 SYNC subgroups and a Mark 1 subgroup will be generated. Thus, at address 176 the Mark 2 subgroup is written followed by a jump to address 15 which produces a SYNC subgroup. After incrementing to address 16 the second SYNC subgroup is generated followed by the generation of a Mark 1 subgroup at address 17. At this point, the remaining data groups are written as before. This resync process will occur every time 158 data groups have been written and the next data group is a full group.

For several reasons which will be described below, it may be necessary to jump to that portion of the GCR PROM 66 program which causes the postamble shown in FIG. 1E to be written. This process begins at address 192 of the instruction PROM 66. As can be seen, the postamble instruction at address 192 (PSTMBL) will cause the generation of a SYNC subgroup corresponding to the end mark shown in FIG. 1E. Thereafter, as a result of incrementing the PROM address counter 64 (FIG. 4), the residual group, the CRC group, the Mark 2 subgroup, a plurality of SYNC subgroups (addressed 196-209), the second last termination subgroup and the last termination subgroup will be generated.

FIG. 5 is a logic diagram corresponding to the PROM address control 62 shown in FIG. 4. As described above, there are those situations when it becomes necessary to either jump to address 15 of the GCR PROM program to write the re-sync group or to address 192 to write the postamble. The jump to 15 requirement has already been described as being necessary when more than 158 data groups have been written and the 159th data group is a full group. In this case, the ZGRAD-15 signal or, prior to inversion in inverter 90, the $\overline{\text{ZGRAD-15}}$ signal is generated at the output of NAND gate 88. NAND gate 88 has two inputs. The first is FLDTCRCNTR which is generated by 5-state counter 61 (FIG. 4) and corresponds to a strobe that loads the output shift register 74 (FIG. 4) and also steps the PROM address control 62 (FIG. 4). The 5-state counter 61 is synchronized with the output data stream by the GCRBUFCLR clock. The second input to NAND gate 88 is generated at the output of OR gate 104 if one of two conditions exist. First, NAND gate 102 will have an O output when the jump to 15 instruction (JMPTO-15) has been decoded in GCR PROM decode 68 (FIG. 4) and when BFR13FL (the 13th position in buffer 48 is full) and when there is no terminate signal (i.e., FGINTRM is low). Second, if BRF13FL and JMPTO-15 and FGINTRM are all true and the last group of data stored in buffers A46 and B48 is a full group when the terminate signal is received (i.e. FEND is true) NAND gate 108 will generate a O thus producing a 1 at the output of OR gate 104.

The jump to 192 signal or ZGRAD-192 is generated under three conditions each of which are shown as inputs to OR gate 92. The first, ZGRAD-192; OAA corresponds to the situation when a full group of data has been stored in buffers A46 and B48 when a terminate signal is received. ZGRAD-192; OAB occurs when a partial group of data has been stored in buffers A46 and B48 after the first group had been transmitted when a terminate signal is received. Finally, ZGRAD-192; OAC corresponds to the situation when the terminate signal is received and a total of less than 7 user bytes (less than a full group) has been received. Any of these conditions will cause a jump to 192 signal to be generated and applied to PROM address counter 64 (FIG. 4). The remaining two signals applied to PROM address counter 69 from PROM address control 62 are the outputs of NAND gate 84 and 100 i.e., the GCR address counter clock ($GCRADCNT-CLK) and the load GCR address counter signal (¢LDGCRADCNT) respectively. The conditions which cause these signals to be generated are strobed by the raw clock signal $CA-RAW applied to a first input of NAND gates 84 and 86. The output of OR gate 96 is coupled to the second input of NAND gate 100 and corresponds to the situation when either a jump to 15 or a jump to 92 instruction has been generated. If either of these conditions exist, NAND gate 100 will generate the ¢LDGCRADCNT signal.

The output of OR gate 82 is coupled into the second input of NAND gate 84 which generates the address counter clock. Three conditions will enable an output of OR gate 82. Each of these conditions is represented by an O output of NAND gates 76, 78 or 80. An enabling output will appear at the output of NAND gate 80 when the FLDTCRCNTR signal appears at the output of 5-state counter 61 (FIG. 4) and when a preamble or postamble (¢PRMBL/¢PSTMBL) instruction is decoded by GCR PROM DECODE 68 (FIG. 4). The NAND gate 78 will generate an enabling output upon the occurrence of the FLDTCRCNTR if the write GCR data instruction (¢WRTGDTA) is decoded in GCR PROM decode 68 (FIG. 4) and if FBF-B/A-SEL is true. The latter signal may be the output of a flip-flop (not shown) which selects the source of data i.e. either buffer A46 or buffer B48, which is switched into code converter 52 by switch 50. FBF-B/A-SEL is true each time buffer B48 is switched into code converter 52 indicating that another data group has been processed. Finally, NAND gate 76 will present an enabling output when ¢STAL and DGCRM are both true. ¢STAL is decoded in GCR PROM decode 68 when PROM address counter 64 is at 0, the initialized state. DGCRM is generated by microprogrammable controller logic 2 when a GCR record is to be written.

| GCR CODE CONVERSION | | | |
|---|---|---|---|
| ADR | SPECIAL CHAR. | AND DATA PROM | |
| 00 | 0001 | 0011 | DATA |
| 01 | 0000 | 1011 | ↑ |
| 02 | 0001 | 0111 | ↑ |
| 03 | 0000 | 1111 | ↑ |
| 04 | 0000 | 1001 | ↑ |
| 05 | 0000 | 1010 | ↑ |
| 06 | 0000 | 1101 | ↑ |
| 07 | 0000 | 1110 | ↑ |
| 08 | 0001 | 1011 | ↓ |
| 09 | 0001 | 0010 | ↓ |
| 0A | 0001 | 0101 | ↓ |
| 0B | 0001 | 0110 | ↓ |
| 0C | 0001 | 1001 | ↓ |
| 0D | 0001 | 1010 | ↓ |
| 0E | 0001 | 1101 | ↓ |
| 0F | 0001 | 1110 | DATA |
| 10-1F | 0001 | 1111 | SYNC |
| 20-2F | 0001 | 1100 | MARK 1 |
| 30-3F | 0000 | 0111 | MARK 2 |
| 40-4F | 0001 | 0101 | 1st TERM |
| 50-5F | 0000 | 1111 | 2nd TERM (F) |
| 60-6F | 0001 | 1110 | 2nd TERM (1) |
| 70-7F | 0000 | 0000 | — |

APPENDIX A
GCR PROM PROGRAM

| ADR | INSTRUCTION PROM | | SPEC CHAR ADDRESS PROM | |
|---|---|---|---|---|
| 00 | 0 | STL | 0000 | STL |
| 01 | 1 | PRMBL | 0100 | 1st term |
| 02 | 1 | PRMBL | 0110 | 2nd term (1) |
| 03 | 1 | PRMBL | 0001 | SYNC |
| ↑↓ | ↑↓ | ↑ | ↑↓ | ↑↓ |
| 16 | 1 | ↓ | 0001 | SYNC |
| 17 | 1 | PRMBL | 0010 | MARK 1 |
| 18 | 2 | WRTGDTA | 0000 | DTA |
| ↑↓ | ↑↓ | | ↑↓ | ↑↓ |
| 175 | 2 | WRTGDTA | 0000 | DTA |
| 176 | 3 | JMPT015 | 0011 | MARK 2 |
| 177 | 0 | — | 0000 | STL/DTA |
| ↑↓ | ↑↓ | | ↑ ↓ | |
| 191 | 0 | — | 0000 | DTA |
| 192 | 1 | PSTMBL | 0001 | SYNC |
| 193 | 2 | WRTGDTA | 0000 | DTA (RES GRP) |
| 194 | 2 | WRTGDTA | 0000 | DTA (CRC GRP) |
| 195 | 1 | PSTMBL | 0011 | MARK 2 |
| 196 | 1 | ↑ | 0001 | SYNC |
| ↑↓ | ↑↓ | ↑↑ | | ↑↓ |
| 209 | 1 | ↓ | 0001 | SYNC |
| 210 | 1 | PSTMBL | 0101 | 2nd term (F) |
| 211 | 4 | PSTMBL/LCC | 0100 | 1st term |
| 212 | 5 | GDTACMP | 0000 | STL |
| 213 | 0 | STL | ↑ | ↑ |

-continued

APPENDIX A
GCR PROM PROGRAM

| ADR | INSTRUCTION PROM | | SPEC CHAR ADDRESS PROM | |
|---|---|---|---|---|
| ↑↓ | ↑↑ | | ↓ | ↓ |
| 255 | 0 | STL | 0000 | STL |

We claim:

1. A GCR write control apparatus for use in a data processing system wherein raw data is group coded recorded prior to being written on magnetic tape, comprising:
first memory means for storing a plurality of instructions;
second memory means for storing a special character table and a code conversion table for converting raw data into GCR data;
first addressing means for accessing said first memory means;
second addressing means for accessing said second memory means, said second addressing means coupled to the output of said first addressing means and to a source of raw data;
transmitting means coupled to the output of said second memory means and synchronized with said raw data for transmitting special characters and converted data to said magnetic tape; and
control means for incrementing said first addressing means.

2. An apparatus according to claim 1 wherein said second addressing means comprises third memory means which is accessed by an address supplied by said first addressing means, said third memory means having an output coupled to said second memory means for providing an address to access said second memory means.

3. An apparatus according to claim 2 wherein said second memory means provides a special character when the address supplied by said third memory means is greater than zero.

4. An apparatus according to claim 3 wherein said second memory converts said raw data to GCR data when the address supplied by said third memory means is zero.

5. An apparatus according to claim 4 wherein said first addressing means is a binary counter.

6. An apparatus according to claim 5 further including decoding means coupled to the output of said first memory means for decoding instructions accessed from said first memory means.

7. An apparatus according to claim 6 wherein said transmitting means is shift register.

8. An apparatus according to claim 7 wherein said first memory means is a programmable read-only memory.

9. An apparatus according to claim 8 wherein said second memory means is a programmable read-only memory.

10. An apparatus according to claim 9 wherein said third memory means is a programmable read-only memory.

* * * * *